(12) United States Patent
Schapper

(10) Patent No.: US 12,224,576 B2
(45) Date of Patent: Feb. 11, 2025

(54) PROTECTION CIRCUITRY FOR A DOWNHOLE MEASUREMENT TOOL

(71) Applicant: ChampionX LLC, Sugar Land, TX (US)

(72) Inventor: Robert J. Schapper, Salt Lake City, UT (US)

(73) Assignee: ChampionX LLC, Sugar Land, TX (US)

( * ) Notice: Subject to any disclaimer, the term of this patent is extended or adjusted under 35 U.S.C. 154(b) by 146 days.

(21) Appl. No.: 18/180,641

(22) Filed: Mar. 8, 2023

(65) Prior Publication Data

US 2024/0305088 A1 Sep. 12, 2024

(51) Int. Cl.
| | | |
|---|---|---|
| *H02H 7/08* | (2006.01) | |
| *E21B 17/02* | (2006.01) | |
| *E21B 43/12* | (2006.01) | |
| *E21B 47/017* | (2012.01) | |

(52) U.S. Cl.
CPC ............. *H02H 7/08* (2013.01); *E21B 17/028* (2013.01); *E21B 43/128* (2013.01); *E21B 47/017* (2020.05)

(58) Field of Classification Search
CPC ....... H02H 7/08; E21B 17/028; E21B 43/128; E21B 47/017
See application file for complete search history.

(56) References Cited

U.S. PATENT DOCUMENTS

| | | | |
|---|---|---|---|
| 5,282,508 A | | 2/1994 | Ellingsen et al. |
| 5,323,855 A | * | 6/1994 | Evans ................. E21B 43/2401 |
| | | | 166/66.5 |
| 5,515,038 A | | 5/1996 | Smith |
| 6,176,308 B1 | | 1/2001 | Pearson |
| 7,287,591 B2 | * | 10/2007 | Campbell ............... E21B 27/02 |
| | | | 166/305.1 |

(Continued)

FOREIGN PATENT DOCUMENTS

WO 2015073420 A1 5/2015

OTHER PUBLICATIONS

"Shockley Diodes and Silicon Controlled Rectifiers (SCRs)", https://www.allaboutcircuits.com/textbook/semiconductors/chpt-7/silicon-controlled-rectifier-scr/, 14 pages.

(Continued)

*Primary Examiner* — Thai T Dinh
(74) *Attorney, Agent, or Firm* — Dorsey & Whitney LLP

(57) ABSTRACT

Systems and methods corresponding to a downhole measurement tool to balance fault current in a protective inductor are disclosed herein. A triggerable network is provided which keeps an alternating current balanced in a protective choke during a phase-to-ground fault condition in a power cable or a downhole motor of an electrical submersible pump. The triggerable network causes a conducting of current during negative polarity voltage portion(s) of the phase-to-ground fault condition via a silicon-controlled rectifier having an anode and a cathode on a path of current conduction for the negative polarity voltage during the phase-to-ground fault condition and one or more Zener diodes, where an ending cathode of the one or more Zener diodes is coupled to a gate of the silicon-controlled rectifier and an ending anode of the one or more Zener diodes is coupled to the anode of the silicon-controlled rectifier.

24 Claims, 2 Drawing Sheets

(56) References Cited

U.S. PATENT DOCUMENTS

| | | | |
|---|---|---|---|
| 8,149,552 B1 * | 4/2012 | Cordill | E21B 47/008 |
| | | | 361/42 |
| 9,541,594 B2 | 1/2017 | Curtis | |
| 9,541,595 B2 | 1/2017 | Curtis | |
| 9,541,596 B2 | 1/2017 | Curtis | |
| 9,547,032 B2 | 1/2017 | Curtis | |
| 9,602,100 B1 | 3/2017 | Cordill | |
| 9,645,184 B2 | 5/2017 | Curtis | |
| 9,722,408 B2 | 8/2017 | Curtis | |
| 9,759,837 B2 * | 9/2017 | Grente | G01V 11/002 |
| 10,060,257 B2 | 8/2018 | Douglas | |
| 10,141,142 B2 * | 11/2018 | Curtis | H01H 47/00 |
| 2013/0342962 A1 | 12/2013 | Fletcher et al. | |
| 2014/0177109 A1 | 6/2014 | Curtis et al. | |
| 2014/0177110 A1 | 6/2014 | Curtis et al. | |
| 2014/0177117 A1 | 6/2014 | Curtis et al. | |
| 2016/0006481 A1 | 1/2016 | Rendusara et al. | |
| 2016/0069166 A1 | 3/2016 | Hallundbæk et al. | |
| 2016/0259086 A1 | 9/2016 | Grente et al. | |
| 2018/0076706 A1 | 3/2018 | Betzin et al. | |

OTHER PUBLICATIONS

Jia, Rabiyya Khan "Zener Diode: Basic Operation and Applications", https://www.digikey.com/en/maker/blogs/zener-diode-basic-operation-and-applications#:~:text=A%20Zener%20diode%20is%a,certain%20specified%20voltage%20is%20reached., Dec. 16, 2015, 6 pages.

* cited by examiner

PROTECTION CIRCUITRY FOR A DOWNHOLE MEASUREMENT TOOL

TECHNICAL FIELD

This disclosure relates generally to a downhole measurement tool circuit and method to balance fault current in a protective inductor, and more particularly to a downhole measurement tool circuit and method to balance fault current in a protective inductor which keeps an alternating current balanced in a protective choke during a phase-to-ground fault condition in a power cable or a downhole motor of an electrical submersible pump.

BACKGROUND

Various types of downhole equipment, such as pumps and similar devices, are used to move fluids from beneath the surface of the earth to the surface. Well known applications include oil and gas wells and water wells. A typical downhole arrangement would include a string composed of a series of tubes or tubing suspended from the surface. One type of well-known pump is a downhole electrical submersible pump. The electrical submersible pump either includes or is connected to a downhole motor that is sealed so that the whole assembly is submerged in the fluid to be pumped. The downhole motor is connected to a three-phase power source at the surface and operates beneath the level of fluid downhole in order to pump the fluid to the surface.

Many downhole measurement tools associated with an electrical submersible pump are connected to the Y-point of the downhole motor of the electrical submersible pump and to the ground of the downhole system, such as disclosed in U.S. Pat. No. 6,176,308, which is incorporated herein by reference. The three-phase power supply for the electrical submersible pump is isolated from the ground, and the downhole measurement tool utilizes this feature to communicate to an associated surface equipment of a downhole system by low frequency modulation of a current or voltage supplied by the associated surface equipment. The downhole measurement tool is coupled to the electrical submersible pump and used to monitor certain downhole parameters, such as pressure and temperature, of a subterranean borehole.

Herein, the term "coupled" has its ordinary and customary meaning in the art and is broad enough to include a connection between two items. In some instances, this connection may be a direct physical connection between the two items. In other instances, the two items may be coupled via one or more intermediary elements. For example, a first circuit element and a second circuit element may be understood to be coupled either when they are directly connected physically, or when one or more intermediary circuit elements exists between the first circuit element and the second circuit element. The term "coupling" has its ordinary and customary meaning in the art and is broad enough to include, as used herein in the context of circuit elements, making a connection that enables electrical connectivity/electrical flow between coupled items.

A phase-to-ground fault occurs in the downhole motor or power cable of the downhole system will apply high voltage alternating current to the Y-point of the downhole motor of the electrical submersible pump, and consequently to the downhole measurement tool. To prevent damage to the downhole measurement tool during this fault condition, a protective choke is typically included in the circuitry of the downhole measurement tool, which provides a suitably high impedance to minimize the alternating current flowing from the Y-point to the ground of the downhole system through the circuitry of the downhole measurement tool.

Another typical requirement of many downhole measurement tools is to be able to use a negative polarity, direct current megger to check the electrical insulation quality of the power cable and/or downhole motor of the downhole system. For this purpose, the circuitry of the downhole measurement tool typically includes a diode, which only conducts during positive polarity voltage. However, since the diode only conducts in the positive polarity voltage, during a phase-to ground fault of alternating current voltage, the current in the protective choke will reach a direct current level that saturates the choke and lowers its inductance, accordingly reducing its protective function. In order to eliminate this saturation condition, a large capacitor is typically included in the circuitry of the downhole measurement tool in order to keep the choke current balanced during a phase-to-ground fault condition. The voltage and temperature ratings, plus the large physical sizes for suitable chokes and capacitors cause them to be expensive and physically large, which may involve additional mechanical mounting considerations as described by U.S. Pat. No. 6,176,308.

It is therefore desirable to provide, for example, a downhole measurement tool circuit and method to balance fault current in a protective inductor that keeps a protective choke current balanced in the event of a phase-to-ground fault in a power cable or a downhole motor of an electrical submersible pump of a downhole system.

It is further desirable to provide a downhole measurement tool circuit and method to balance fault current in a protective inductor that eliminates the need for a large, expensive capacitor for protection against choke saturation, thereby reducing the size and cost of the downhole measurement tool.

It is still further desirable to provide a downhole measurement tool circuit and method to balance fault current in a protective inductor that causes a conducting of current during the negative polarity voltage portions of a phase-to ground fault condition, but which do not cause a conduction of negative polarity voltage during use of a negative polarity megger.

Other advantages and features will be apparent from the following description, and from the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
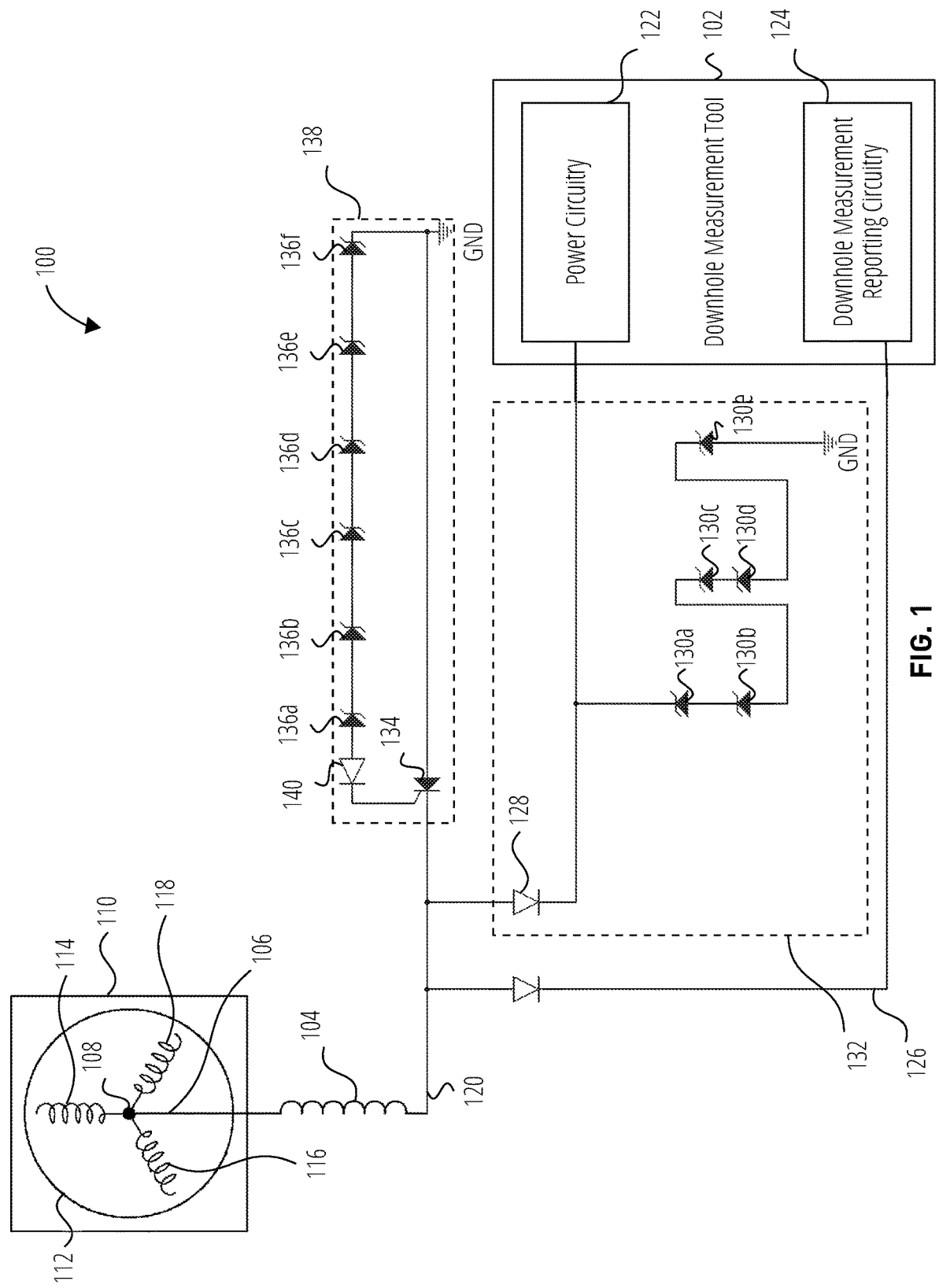
FIG. 1 illustrates an electrical schematic showing circuitry to balance fault current in a protective inductor corresponding to a downhole measurement tool, in accordance with embodiments disclosed herein.

In general, in a first aspect, the disclosure relates to a downhole system capable of balancing an alternating current between a power cable or a downhole motor of an electrical submersible pump and a downhole measurement tool during a phase-to-ground fault condition. The downhole system comprises a coupling between a Y-point of the downhole motor of the electrical submersible pump and the downhole measurement tool and a triggerable network that selectively conducts during application of a negative polarity voltage to the downhole measurement tool. The downhole system may include an inductor coupled to the Y-point of the downhole motor of the electrical submersible pump and the downhole measurement tool. The inductor is of selected inductance for filtering alternating current ripple voltage from the downhole motor of the electrical submersible pump to the downhole measurement tool.

The triggerable network of the downhole system may comprise a silicon-controlled rectifier along a path of current conduction for the negative polarity voltage during the phase-to-ground fault condition. The triggerable network may further comprise a gate input of the silicon-controlled rectifier coupled to an ending anode of a group of one or more first Zener diodes (which may be connected in series and with a same polarity when more than one Zener diode is used in the group). Herein, the term "ending anode" may be understood to be an anode of one of the one or more first Zener diodes that is not coupled to a cathode of another of the one or more first Zener diodes (e.g., in the case that more than one Zener diode is used in series).

Within the triggerable network, an ending cathode of the group of one or more first Zener diodes may be coupled to the anode of the silicon-controlled rectifier. Herein, the term "ending cathode" may be understood to be a cathode of one of the one or more Zener diodes that is not coupled to an anode of another of the one or more first Zener diodes (e.g., in the case that more than one Zener diode is used in series).

The one or more first Zener diodes may be selected such that a trigger current for the silicon-controlled rectifier at the gate of the silicon-controlled rectifier occurs through the one or more first Zener diodes during the application of the negative polarity voltage. It may be that these one or more first Zener diodes are selected such that the trigger current occurs based on a magnitude of the negative polarity voltage (e.g., the trigger current occurs in response to the negative polarity voltage reaching a magnitude that corresponds to the selection and/or arrangement of the one or more first Zener diodes).

In addition, the downhole system may include a diode providing a path of current conduction for a positive polarity voltage during the phase-to-ground fault condition and a group of one or more second Zener diodes coupled in series to limit the voltage resulting from the positive polarity voltage.

In general, in a second aspect, the disclosure relates to a downhole measurement tool having a circuit capable of balancing an alternating current during a phase-to-ground fault condition, with the downhole measurement tool capable of being coupled to a Y-point of a three-phase downhole motor of an electrical submersible pump. The circuit of the downhole measurement tool includes a triggerable network that selectively conducts during application of a negative polarity voltage to the downhole measurement tool and an inductor commutating circuit to limit the voltage resulting from a positive polarity voltage during the phase-to-ground fault condition.

The triggerable network of the downhole measurement tool may be constructed of a silicon-controlled rectifier along a path of current conduction for the negative polarity voltage during the phase-to-ground fault condition. The triggerable network can further comprise a gate input of the silicon-controlled rectifier coupled to an ending anode of one or more first Zener diodes connected in series. The one or more first Zener diodes may provide a trigger current for the silicon-controlled rectifier, and the one or more first Zener diodes can selectively control the conduction of the silicon-controlled rectifier. Further, the trigger current may occur (or not) based on the magnitude of the negative polarity voltage. Moreover, the inductor commutating circuit of the downhole measurement tool can include a diode providing a path of current conduction for a positive polarity voltage during the phase-to-ground fault condition and a one or more second Zener diodes coupled in series to limit the voltage resulting from the positive polarity voltage. The downhole measurement tool may also include an inductor being of selected inductance for filtering alternating current ripple voltage to the downhole measurement tool.

In general, in a third aspect, the disclosure relates to a method of balancing a phase-to-ground fault condition between a power cable or a three-phase downhole motor of an electrical submersible pump and a downhole measurement tool. The method comprises the steps of coupling to a Y-point of the downhole motor of the electrical submersible pump to the downhole tool; selectively conducting a negative polarity voltage to the downhole measurement tool during the phase-to-ground fault condition; and providing a path of current conduction for a positive polarity voltage during the phase-to-ground fault condition.

The step of selectively conducting the negative polarity voltage may be via a triggerable network comprising a silicon-controlled rectifier along a path of current conduction for the negative polarity voltage during the phase-to-ground fault condition. The method may further include the step of providing a trigger current for the silicon-controlled rectifier based on the magnitude of the negative polarity voltage. If the magnitude of the negative polarity voltage is sufficient, the method causes one or more first Zener diodes to provide the trigger current sufficient to trigger the silicon-controlled rectifier thereby causing the silicon-controlled rectifier to conduct current during the negative polarity voltage of the phase-to-ground fault condition. If the magnitude of the negative polarity voltage is insufficient, the method causes the one or more first Zener diodes not to provide the trigger current, such that the silicon-controlled rectifier does not conduct current.

FIG. 1 illustrates an electrical schematic 100 showing circuitry to balance fault current in a protective inductor corresponding to a downhole measurement tool, in accordance with embodiments disclosed herein. The electrical schematic 100 relates to any electrical apparatus, in particular a downhole measurement tool 102, which is protected from phase-to-ground fault currents by a protective choke 104. A downhole measurement tool 102 may be coupled by a lead 106 (and through the various other circuit elements illustrated, including, for example, the protective choke 104) to the Y-point 108 of an electrical submersible pump 110. The electrical submersible pump 110 includes a downhole motor 112 that has three field coils (the field coil 114, the field coil 116, and the field coil 118), with each of the field coils 114, 116, and 118 having a common connection at one end, the Y-point 108, and where their other ends are respectively coupled through leads to a source of three-phase power (not shown). The source of three-phase power produces alternating voltage on the three field power leads, which are out of phase with respect to one another by one hundred and twenty degrees.

The Y-point 108 of the downhole motor 112 of the electrical submersible pump 110 is coupled through the lead 106 to one end of an inductor, i.e., the protective choke 104, for filtering alternating current ripple voltage from getting to the downhole measurement tool 102 and the other end of the protective choke 104 is connected to additional circuitry, as appropriate, of the downhole measurement tool 102 via the circuitry of the electrical schematic 100 as provided herein. The path of positive current during a normal, no-fault condition of the downhole measurement tool 102 flows from the protective choke 104 through a lead 120 and to the additional circuitry of the downhole measurement tool 102. As illustrated, the path of positive current during the normal, no-fault condition provides electrical energy to the power circuitry 122 used by the downhole measurement tool 102, thereby enabling the power circuitry 122 to provide operational power to the downhole measurement tool 102. Using this power, the downhole measurement tool 102 is enabled to operate the downhole measurement reporting circuitry 124 to provide signaling back to the Y-point 108 of the downhole motor 112 through a lead 126.

The operation of the electrical schematic 100 during a phase-to-ground fault will now be discussed. During a phase-to-ground fault, the first Zener diodes 136a, 136b, 136c, 136d, 136e, and 136f handle a negative polarity portion of alternating current voltage, while the second Zener diodes 130a, 130b, 130c, 130d, and 130e handle a positive polarity portion of the alternating current voltage.

When a phase-to-ground fault is detected, which applies high alternating current voltage to the Y-point 108, a diode 128 provides a path of current conduction during positive polarity voltage resulting from the phase-to ground fault condition. The set of second Zener diodes 130a to 130e are coupled in series and clamp the voltage resulting from the positive polarity voltage to prevent damage to the additional circuitry of the downhole measurement tool. Based on this behavior, the diode 128 and the second Zener diodes 130a to 130e may be understood to form an inductor commutating circuit 132. Note that during use of a negative polarity megger (not shown), the diode 128 does not conduct and should be of sufficient reverse voltage rating to allow use of the megger.

The electrical schematic 100 further includes a silicon-controlled rectifier 134, the anode and cathode of which form part of a path for current during the negative polarity portion of alternating current voltage during a phase to-ground fault condition. The gate input of the silicon-controlled rectifier 134 is coupled to an ending anode of the set of first Zener diodes 136a to 136f (where the anode of the Zener diode 136a acts as the ending anode with respect to the series of first Zener diodes 136a to 136f). Further, the anode of the silicon-controlled rectifier 134 is coupled to an ending cathode of the set of first Zener diodes 136a to 136f (where the cathode of the Zener diode 136f acts as the ending cathode with respect to the series of first Zener diodes 136a to 136f). The anode of the silicon-controlled rectifier 134 and the ending cathode of the set of first Zener diodes 136a to 136f (the cathode of the 136f) are also coupled to ground, as illustrated. These connections form a triggerable network 138 (as illustrated), where the first Zener diodes 136a to 136f allow for a sufficient trigger current to activate the gate of the silicon-controlled rectifier 134 when a negative voltage of a sufficient magnitude is present on the Y-point 108, such as may occur during a phase-to-ground fault condition.

The silicon-controlled rectifier 134 may be of the sensitive-gate type, such that even a small amount of gate trigger current can trigger the silicon-controlled rectifier 134 into a conducting state. The illustrated polarity of the first Zener diodes 136a to 136f acts to reduce false triggering of the silicon-controlled rectifier 134 by blocking currents corresponding to cases of relatively small negative polarity voltage. Further, the first Zener diodes 136a to 136f are sized/rated such that an adequate trigger current is made available to the gate of the silicon-controlled rectifier 134 through the first Zener diodes 136a to 136f when a sufficient negative polarity voltage of the phase-to-ground fault condition to overcome the (collective) Zener breakdown voltage rating of the first Zener diodes 136a to 136f is present at the Y-point 108.

In some embodiments, with respect to the triggerable network 138, if the rate of increase of the negative polarity voltage is of a sufficient magnitude, the triggerable network 138 may trigger even prior to reaching the (collective) Zener breakdown voltage of the first Zener diodes 136a to 136f. This aspect acts to further protect the downhole measurement tool 102 with respect to quickly-occurring negative polarity voltages.

Note that the first Zener diodes 136a through 136f should (at least collectively) have a sufficient Zener breakdown voltage rating to allow the use of a direct current voltage associated with a megger without a sufficient trigger current causing the gate of the silicon-controlled rectifier 134 to turn the silicon-controlled rectifier 134 on into a conducting state.

In some embodiments, the triggerable network 138 further includes a blocking diode 140 coupled between the gate of the silicon-controlled rectifier 134 and the ending anode of the first Zener diodes 136a through 136f, as illustrated. The blocking diode 140 may block a small current through the gate of the silicon-controlled rectifier 134 that might otherwise occur during the normal, no-fault condition of the downhole measurement tool 102 (e.g., when there is no phase-to-ground fault condition). This helps to ensure that the silicon-controlled rectifier 134 remains in a non-conducting state during the normal, no-fault condition of the downhole measurement tool 102. In embodiments using the blocking diode 140, it will be understood that the gate of the silicon-controlled rectifier 134 and ending anode of the first Zener diodes 136a through 136f are coupled to each other through/via the blocking diode 140.

Note that while FIG. 1 illustrates the inductor commutating circuit 132 and the triggerable network 138 as separate elements from the downhole measurement tool 102, this is provided by way of example and not by way of limitation. In other embodiments, it may be that the inductor commutating circuit 132 and/or the triggerable network 138 are integrated into the downhole measurement tool 102 (rather than existing in a physically separated manner from the downhole measurement tool 102).

While the example embodiment in FIG. 1 utilizes six first Zener diodes 136a to 136f as part of the triggerable network 138, it will be appreciated in keeping with the spirit and scope of the electrical schematic 100 that the number of Zener diodes used as part of a triggerable network may be dependent on the Zener breakdown voltage rating of (each of) the Zener diodes. In addition, it will be appreciated that the number of Zener diodes used as part of a triggerable network may also be dependent on a desired megger voltage rating (e.g., may be selected such that the collective Zener breakdown voltage rating(s) of that number of Zener diode(s) exceeds an expected magnitude of a negative polarity voltage applied to the system by the megger during the use of the megger).

For purposes of example and not by way of limitation, the electrical schematic 100 may utilize the protective choke 104 having a value of approximately 150 to approximately 200 Henries and suitable for approximately 12 mA of direct current. In addition, the diode 128 may have a voltage rating of approximately 2,000 volts and be rated at about 0.5 amp. Moreover, each of the second Zener diodes 130a to 130e may be rated at approximately 10 volts each and be suitable for the current and power dissipation during a positive polarity voltage of a phase-to ground fault condition. Again, the silicon-controlled rectifier 134 may be a sensitive gate type silicon-controlled rectifier and may be rated at about 1600 volts, 30 amps, and for the use of a one milliamp (ma) gate current. In some embodiments, the first Zener diodes 136a to 136f may have Zener breakdown voltages between, for example, 100 and 200 volts, for a collective/effective Zener breakdown voltage through the first Zener diodes 136a to 136f of 1.1 kilovolts (kV). In other embodiments, the Zener breakdown voltages of one or more Zener diodes analogously arranged may be set such that the applicable collective/effective Zener breakdown voltage is instead some other value, such as 1 kV, 900 volts, 800 volts, 1.2 kV, etc.

Figure 2:
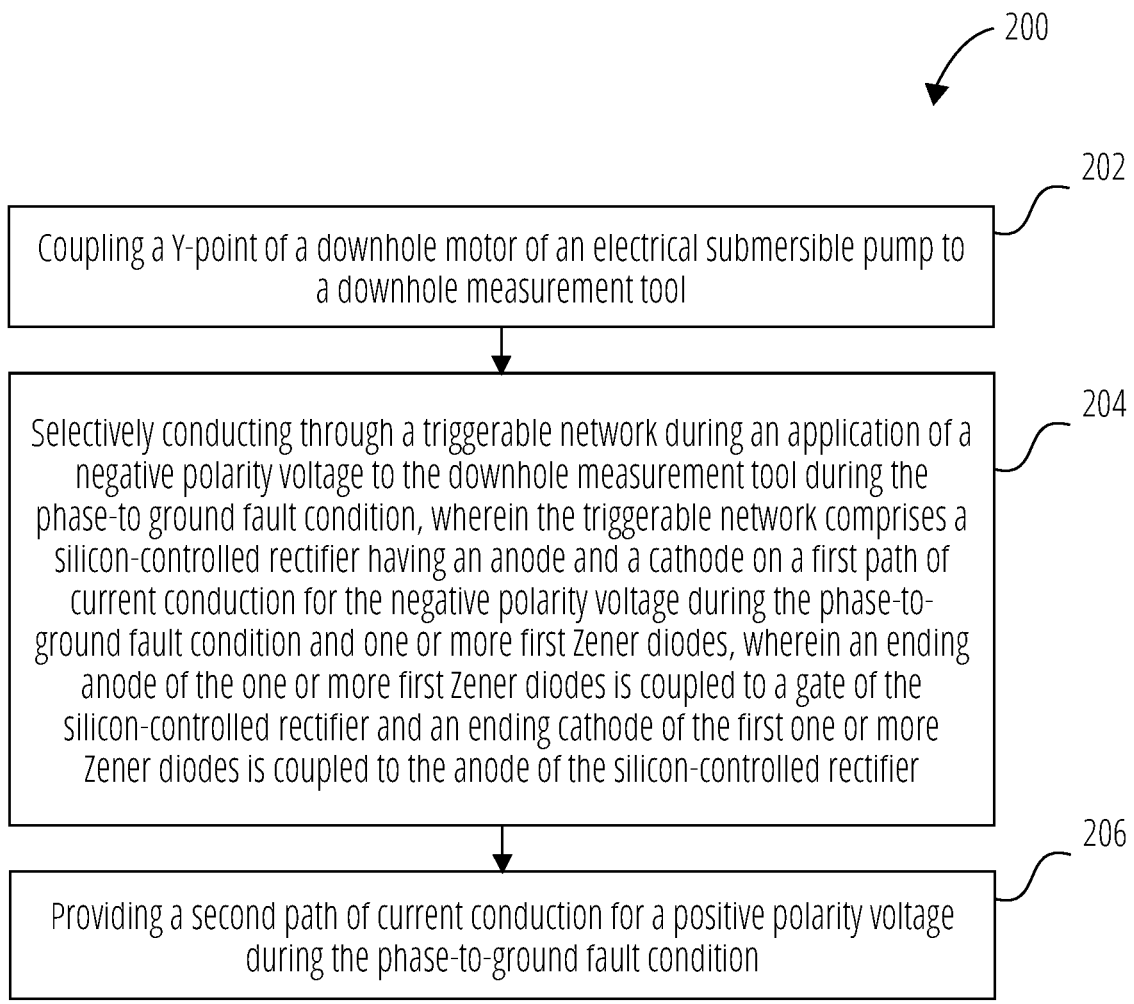
FIG. 2 illustrates a method of balancing a phase-to-ground fault condition between a power cable or a three-phase downhole motor of an electrical submersible pump and a downhole measurement tool, according to embodiments disclosed herein.

FIG. 2 illustrates a method 200 of balancing a phase-to-ground fault condition between a power cable or a three-phase downhole motor of an electrical submersible pump and a downhole measurement tool, according to embodiments disclosed herein. The method 200 includes coupling 202 a Y-point of the downhole motor of the electrical submersible pump to the downhole measurement tool. The method 200 further includes selectively conducting 204 through a triggerable network during an application of a negative polarity voltage to the downhole measurement tool during the phase-to ground fault condition, wherein the triggerable network comprises a silicon-controlled rectifier having an anode and a cathode on a first path of current conduction for the negative polarity voltage during the phase-to-ground fault condition and one or more first Zener diodes, wherein an ending anode of the one or more first Zener diodes is coupled to a gate of the silicon-controlled rectifier and an ending cathode of the first one or more Zener diodes is coupled to the anode of the silicon-controlled rectifier. The method 200 further includes providing 206 a second path of current conduction for a positive polarity voltage during the phase-to-ground fault condition.

In some embodiments of the method 200, the one or more first Zener diodes comprises a plurality of Zener diodes coupled in series.

In some embodiments of the method 200, a trigger current for the silicon-controlled rectifier at the gate of the silicon-controlled rectifier occurs through the one or more first Zener diodes during the application of the negative polarity voltage. In some such embodiments, the trigger current occurs based on a magnitude of the negative polarity voltage.

In some embodiments of the method 200, the second path of current conduction for the positive polarity voltage comprises a diode and one or more second Zener diodes configured to limit a magnitude of the positive polarity voltage. In some such embodiments, the one or more second Zener diodes comprises a plurality of Zener diodes coupled in series.

In some embodiments of the method 200, the Y-point of the downhole motor of the electrical submersible pump is coupled to the downhole measurement tool through an inductor of a selected inductance for filtering alternating current ripple voltage from the downhole motor of the electrical submersible pump to the downhole measurement tool; the anode of the silicon-controlled rectifier is coupled to a ground; and the cathode of the silicon-controlled rectifier is coupled to the inductor.

In some embodiments of the method 200, the triggerable network further comprises a blocking diode, and the ending anode of the one or more first Zener diodes and the gate of the silicon-controlled rectifier are coupled through the blocking diode.

The circuits and methods discussed herein are merely illustrative of specific manners in which to make and/or use the disclosed systems, and are not to be interpreted as limiting in scope. While various circuits and methods have been described herein with a certain degree of particularity, it is to be noted that many modifications may be made in the details of the construction and the arrangement of the electrical components and/or operations described herein without departing from the spirit and scope of this disclosure. It will be understood that circuits and/or methods corresponding to disclosure herein are not limited to the embodiments set forth herein for purposes of exemplification.

The invention claimed is:

1. A downhole system capable of balancing an alternating current between a power cable or a downhole motor of an electrical submersible pump and a downhole measurement tool during a phase-to-ground fault condition, the downhole system comprising:
   an electrical connection between a Y-point of the downhole motor of the electrical submersible pump and the downhole measurement tool; and
   a triggerable network that selectively conducts during an application of a negative polarity voltage to the downhole measurement tool during the phase-to-ground fault condition, the triggerable network comprising:
      a silicon-controlled rectifier having an anode and a cathode on a first path of current conduction for the negative polarity voltage during the phase-to-ground fault condition; and
      one or more first Zener diodes, wherein an ending anode of the one or more first Zener diodes is coupled to a gate of the silicon-controlled rectifier and an ending cathode of the first one or more Zener diodes is coupled to the anode of the silicon-controlled rectifier.

2. The downhole system capable of claim 1, wherein the one or more first Zener diodes comprises a plurality of Zener diodes coupled in series.

3. The downhole system capable of claim 1, wherein a trigger current for the silicon-controlled rectifier at the gate of the silicon-controlled rectifier occurs through the one or more first Zener diodes during the application of the negative polarity voltage.

4. The downhole system capable of claim 3, wherein the trigger current occurs based on a magnitude of the negative polarity voltage.

5. The downhole system capable of claim 1, further comprising a diode providing a second path of current conduction for a positive polarity voltage during the phase-to-ground fault condition and one or more second Zener diodes configured to limit a magnitude of the positive polarity voltage.

6. The downhole system capable of claim 5, wherein the one or more second Zener diodes comprises a plurality of Zener diodes coupled in series.

7. The downhole system capable of claim 1, further comprising an inductor coupled to the Y-point of the downhole motor of the electrical submersible pump and the downhole measurement tool, the inductor being of a selected inductance for filtering alternating current ripple voltage from the downhole motor of the electrical submersible pump to the downhole measurement tool, wherein:
the anode of the silicon-controlled rectifier is coupled to a ground; and
the cathode of the silicon-controlled rectifier is coupled to the inductor.

8. The downhole system capable of claim 1, wherein the triggerable network further comprises a blocking diode, and wherein the ending anode of the one or more first Zener diodes and the gate of the silicon-controlled rectifier are coupled through the blocking diode.

9. A downhole measurement tool having circuitry capable of balancing an alternating current during a phase-to-ground fault condition, the downhole measurement tool capable of being coupled to a Y-point of a three-phase downhole motor of an electrical submersible pump, the circuitry of the downhole measurement tool comprising:
a triggerable network that selectively conducts during an application of a negative polarity voltage to the downhole measurement tool, the triggerable network comprising:
a silicon-controlled rectifier having an anode and a cathode on a first path of current conduction for the negative polarity voltage during the phase-to-ground fault condition; and
one or more first Zener diodes, wherein an ending anode of the one or more first Zener diodes is coupled to a gate of the silicon-controlled rectifier and an ending cathode of the first one or more Zener diodes is coupled to the anode of the silicon-controlled rectifier; and
an inductor commutating circuit to limit a magnitude of a positive polarity voltage during the phase to-ground fault condition.

10. The downhole measurement tool of claim 9, wherein the one or more first Zener diodes comprises a plurality of Zener diodes coupled in series.

11. The downhole measurement tool of claim 9, wherein a trigger current for the silicon-controlled rectifier at the gate of the silicon-controlled rectifier occurs through the one or more first Zener diodes during the application of the negative polarity voltage.

12. The downhole measurement tool of claim 11, wherein the trigger current occurs based on a magnitude of the negative polarity voltage.

13. The downhole measurement tool of claim 9, wherein the inductor commutating circuit comprises a diode providing a second path of current conduction for the positive polarity voltage during the phase-to-ground fault condition and one or more second Zener diodes.

14. The downhole measurement tool of claim 13, wherein the one or more second Zener diodes comprises a plurality of Zener diodes coupled in series.

15. The downhole measurement tool of claim 9, further comprising an inductor coupled to the Y-point of the downhole motor of the electrical submersible pump and the downhole measurement tool, the inductor being of a selected inductance for filtering alternating current ripple voltage from the downhole motor of the electrical submersible pump to the downhole measurement tool, wherein:
the anode of the silicon-controlled rectifier is coupled to a ground; and
the cathode of the silicon-controlled rectifier is coupled to the inductor.

16. The downhole measurement tool of claim 9, wherein the triggerable network further comprises a blocking diode, and wherein the ending anode of the one or more first Zener diodes and the gate of the silicon-controlled rectifier are coupled through the blocking diode.

17. A method of balancing a phase-to-ground fault condition between a power cable or a three-phase downhole motor of an electrical submersible pump and a downhole measurement tool, the method comprising:
coupling a Y-point of the downhole motor of the electrical submersible pump to the downhole measurement tool;
selectively conducting through a triggerable network during an application of a negative polarity voltage to the downhole measurement tool during the phase-to ground fault condition, wherein the triggerable network comprises:
a silicon-controlled rectifier having an anode and a cathode on a first path of current conduction for the negative polarity voltage during the phase-to-ground fault condition; and
one or more first Zener diodes, wherein an ending anode of the one or more first Zener diodes is coupled to a gate of the silicon-controlled rectifier and an ending cathode of the first one or more Zener diodes is coupled to the anode of the silicon-controlled rectifier; and
providing a second path of current conduction for a positive polarity voltage during the phase-to-ground fault condition.

18. The method of claim 17, wherein the one or more first Zener diodes comprises a plurality of Zener diodes coupled in series.

19. The method of claim 17, wherein a trigger current for the silicon-controlled rectifier at the gate of the silicon-controlled rectifier occurs through the one or more first Zener diodes during the application of the negative polarity voltage.

20. The method of claim 19, wherein the trigger current occurs based on a magnitude of the negative polarity voltage.

21. The method of claim 17, wherein the second path of current conduction for the positive polarity voltage comprises a diode and one or more second Zener diodes configured to limit a magnitude of the positive polarity voltage.

22. The method of claim 21, wherein the one or more second Zener diodes comprises a plurality of Zener diodes coupled in series.

23. The method of claim 21, wherein:
the Y-point of the downhole motor of the electrical submersible pump is coupled to the downhole measurement tool through an inductor of a selected inductance for filtering alternating current ripple voltage from the downhole motor of the electrical submersible pump to the downhole measurement tool;
the anode of the silicon-controlled rectifier is coupled to a ground; and
the cathode of the silicon-controlled rectifier is coupled to the inductor.

24. The method of claim 21, wherein the triggerable network further comprises a blocking diode, and wherein the ending anode of the one or more first Zener diodes and the gate of the silicon-controlled rectifier are coupled through the blocking diode.

* * * * *